United States Patent
Hewitt et al.

(10) Patent No.: US 11,556,781 B2
(45) Date of Patent: Jan. 17, 2023

(54) COLLABORATIVE REAL-TIME SOLUTION EFFICACY

(71) Applicant: International Business Machines Corporation, Armonk, NY (US)

(72) Inventors: Trudy L. Hewitt, Cary, NC (US); Kelley Anders, East New Market, MD (US); Jonathan D. Dunne, Dungarvan (IE); Lisa Ann Cassidy, Dublin (IE); Jeremy R. Fox, Georgetown, TX (US); Pauric Grant, Dublin (IE)

(73) Assignee: International Business Machines Corporation, Armonk, NY (US)

( * ) Notice: Subject to any disclaimer, the term of this patent is extended or adjusted under 35 U.S.C. 154(b) by 409 days.

(21) Appl. No.: 16/521,755

(22) Filed: Jul. 25, 2019

(65) Prior Publication Data
US 2020/0401885 A1    Dec. 24, 2020

Related U.S. Application Data

(63) Continuation of application No. 16/445,572, filed on Jun. 19, 2019.

(51) Int. Cl.
*G06N 3/08* (2006.01)
*G06N 20/00* (2019.01)

(52) U.S. Cl.
CPC ............... *G06N 3/08* (2013.01); *G06N 20/00* (2019.01)

(58) Field of Classification Search
CPC ................ G06N 3/08; G06N 20/00
USPC ......................................... 706/25
See application file for complete search history.

(56) References Cited

U.S. PATENT DOCUMENTS

| | | | |
|---|---|---|---|
| 7,152,092 B2 | 12/2006 | Beams | |
| 8,983,975 B2 | 3/2015 | Kenton | |
| 9,195,739 B2 | 11/2015 | Imig | |
| 9,892,193 B2 | 2/2018 | Gangadharaiah | |
| 10,303,586 B1* | 5/2019 | Falko | G06F 11/3636 |
| 2007/0203689 A1* | 8/2007 | Wu | G06F 40/211 |
| | | | 704/2 |

(Continued)

FOREIGN PATENT DOCUMENTS

| | | |
|---|---|---|
| CN | 103229120 A | 7/2013 |
| WO | 2018160723 A1 | 9/2018 |

OTHER PUBLICATIONS

Hewitt et al., "Collaborative Real-Time Solution Efficacy", U.S. Appl. No. 16/445,572, filed Jun. 19, 2019, 38 pages.

(Continued)

*Primary Examiner* — Tsu-Chang Lee
(74) *Attorney, Agent, or Firm* — Randy E. Tejeda

(57) ABSTRACT

In an approach to determining the effectiveness of a proposed solution, one or more computer processors monitor real-time communications. The one or more computer processors identify or more topics associated with the monitored real-time communications. The one or more computer processors feed the identified one or more topics and associated real-time communications into a solution efficacy model. The one or more computer processors generate based on one or more calculations by the solution efficacy model, an efficacy rating for the identified real-time communications. The one or more computer processors generate a prioritization of the identified real-time communications based on the generated efficacy rating.

7 Claims, 4 Drawing Sheets

(56) References Cited

U.S. PATENT DOCUMENTS

| | | | | |
|---|---|---|---|---|
| 2010/0104087 A1* | 4/2010 | Byrd | ............... | H04M 3/5133 |
| | | | | 379/265.09 |
| 2012/0036147 A1* | 2/2012 | Borst | ............... | H04L 51/12 |
| | | | | 707/769 |
| 2012/0185544 A1 | 7/2012 | Chang | | |
| 2013/0336465 A1* | 12/2013 | Dheap | ............... | H04M 3/5166 |
| | | | | 379/88.01 |
| 2014/0172417 A1* | 6/2014 | Monk, II | ............... | G06F 40/30 |
| | | | | 704/9 |
| 2014/0201296 A1* | 7/2014 | Patfield | ............... | G06Q 10/10 |
| | | | | 709/206 |
| 2014/0229910 A1* | 8/2014 | Frenkiel | ............... | G06F 8/447 |
| | | | | 717/145 |
| 2015/0279366 A1 | 10/2015 | Krestnikov | | |
| 2015/0378986 A1* | 12/2015 | Amin | ............... | G06F 40/289 |
| | | | | 704/9 |
| 2016/0148114 A1* | 5/2016 | Allen | ............... | G06N 5/02 |
| | | | | 706/11 |
| 2017/0063745 A1* | 3/2017 | Banerjee | ............... | G06Q 30/0203 |
| 2017/0316775 A1* | 11/2017 | Le | ............... | G10L 15/16 |
| 2018/0144235 A1* | 5/2018 | Ground, Jr | ............... | G06F 16/24522 |
| 2018/0232127 A1* | 8/2018 | Sharifi | ............... | H04L 51/04 |

OTHER PUBLICATIONS

IBM Appendix P, list of patents and patent applications treated as related, Filed Herewith, 2 pages.

Kucukyilmaz et al., "Chat mining: Predicting user and message attributes in computer-mediated communication", Science Direct, Information Processing and Management 44 (2008) 1448-166, Available online Mar. 4, 2008, © 2008 Elsevier, 19 pages.

\* cited by examiner

COLLABORATIVE REAL-TIME SOLUTION EFFICACY

BACKGROUND

The present invention relates generally to the field of communication, and more particularly to real-time communication applications.

Collaborative software or groupware is application software designed to help a plurality of individuals involved in a common task to achieve one or more common goals. In terms of the level of interaction, collaborative software may be divided into: real-time collaborative editing (RTCE) platforms that allow multiple users to engage in live, simultaneous, and reversible editing of a single file, and version control (e.g., revision control and source control) platforms, which allow separate users to make parallel edits to a file, while preserving every saved edit as multiple files. Collaborative software is a broad concept that overlaps considerably with computer-supported cooperative work (CSCW). Collaborative work systems become a useful analytical tool to understand the behavioral and organizational variables that are associated to the broader concept of CSCW.

A recurrent neural network (RNN) is a class of artificial neural network where connections between nodes form a directed graph along a sequence allowing the network to exhibit temporal dynamic behavior for a time sequence. Unlike feedforward neural networks, RNNs can use internal states (memory) to process sequences of inputs allowing the RNN to be applicable to tasks such as unsegmented connected handwriting recognition or speech recognition. Long short-term memory (LSTM) units are alternative layer units of a recurrent neural network (RNN). An RNN composed of LSTM units is referred as a LSTM network. A common LSTM unit is composed of a cell, input gate, output gate, and forget gate. The cell remembers values over arbitrary time intervals and the gates regulate the flow of information into and out of the cell. Gated recurrent units (GRUs) are a gating mechanism in recurrent neural networks. GRU performance on polyphonic music modeling and speech signal modeling was found to be similar to LSTM. However, GRUs exhibit better performance on smaller datasets.

SUMMARY

Embodiments of the present invention disclose a computer-implemented method, a computer program product, and a system for determining the effectiveness of a proposed solution. The computer-implemented method includes one or more computer processors monitoring real-time communications. The one or more computer processors identify or more topics associated with the monitored real-time communications. The one or more computer processors feed the identified one or more topics and associated real-time communications into a solution efficacy model. The one or more computer processors generate based on one or more calculations by the solution efficacy model, an efficacy rating for the identified real-time communications. The one or more computer processors generate a prioritization of the identified real-time communications based on the generated efficacy rating.

DETAILED DESCRIPTION

Collaborative services are ubiquitous in modern organizations, allowing a plurality of individuals and groups the ability to have multiple discussions in a real-time. With respect to collaborative services and applications, real-time chat is the predominant method of communication for most organizations. Collaborative chat applications are used by members of a team, organization, and/or company to identify, diagnose, and remediate problems and issues. For example, software development teams utilize collaboration chat applications to identify sections of faulty code and discuss potential solutions (e.g., alternative code structures etc.). Despite all the aforementioned advantages, real-time collaboration applications allow for low efficacy, short-term, ineffective, solutions distracting or preventing others from communicating and discussing more pertinent and effective solutions.

Embodiments of the present invention recognize that collaborative communication is improved by training a solution efficacy model based on prior solved problems and associated communications, monitoring new communications, identifying new problems, and determining the effectiveness of a proposed solution based on the trained solution efficacy model, in a real-time, collaborative chat application. Embodiments of the present invention allow for solution efficacy to be determined utilizing continuous integration, feature testing, and code coverage testing. Implementation of embodiments of the invention may take a variety of forms, and exemplary implementation details are discussed subsequently with reference to the Figures.

The present invention will now be described in detail with reference to the Figures.

Figure 1:
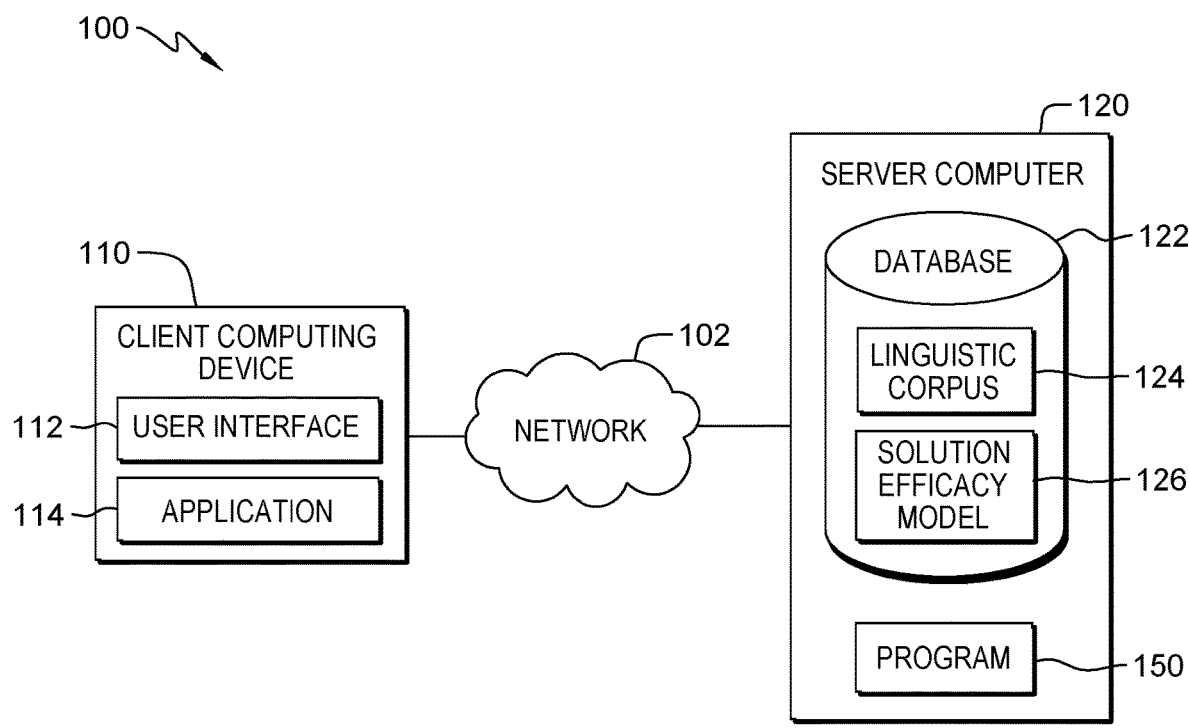
FIG. 1 is a functional block diagram illustrating a computational environment, in accordance with an embodiment of the present invention.

FIG. 1 is a functional block diagram illustrating a computational environment, generally designated 100, in accordance with one embodiment of the present invention. The term "computational" as used in this specification describes a computer system that includes multiple, physically, distinct devices that operate together as a single computer system. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Computational environment 100 includes client computing device 110 and server computer 120, interconnected over network 102. Network 102 can be, for example, a telecommunications network, a local area network (LAN), a wide area network (WAN), such as the Internet, or a combination of the three, and can include wired, wireless, or fiber optic connections. Network 102 can include one or more wired and/or wireless networks that are capable of receiving and transmitting data, voice, and/or video signals, including multimedia signals that include voice, data, and video information. In general, network 102 can be any combination of connections and protocols that will support communications between client computing device 110, server computer 120, and other computing devices (not shown) within computational environment 100. In various embodiments, network 102 operates locally via wired, wireless, or optical connections and can be any combination of connections and protocols (e.g., personal area network (PAN), near field communication (NFC), laser, infrared, ultrasonic, etc.).

Client computing device 110 may be any electronic device or computing system capable of processing program instructions and receiving and sending data. In some embodiments, client computing device 110 may be a laptop computer, a tablet computer, a netbook computer, a personal computer (PC), a desktop computer, a personal digital assistant (PDA), a smart phone, or any programmable electronic device capable of communicating with network 102. In other embodiments, client computing device 110 may represent a server computing system utilizing multiple computers as a server system, such as in a cloud computing environment. In general, client computing device 110 is representative of any electronic device or combination of electronic devices capable of executing machine readable program instructions as described in greater detail with regard to FIG. 4, in accordance with embodiments of the present invention. Client computing device 110 contains user interface 112 and application 114.

User interface 112 is a program that provides an interface between a user of client computing device 110 and a plurality of applications that reside on client computing device 110 (e.g., application 114) and/or may be accessed over network 102. A user interface, such as user interface 112, refers to the information (e.g., graphic, text, sound) that a program presents to a user and the control sequences the user employs to control the program. A variety of types of user interfaces exist. In one embodiment, user interface 112 is a graphical user interface. A graphical user interface (GUI) is a type of interface that allows users to interact with peripheral devices (i.e., external computer hardware that provides input and output for a computing device, such as a keyboard and mouse) through graphical icons and visual indicators as opposed to text-based interfaces, typed command labels, or text navigation. The actions in GUIs are often performed through direct manipulation of the graphical elements. In an embodiment, user interface 112 sends and receives information through application 114 to user program 150.

Application 114 is a set of one of more programs designed to carry out the operations for a specific application to assist a user to perform an activity (e.g., word processing programs, spread sheet programs, media players, web browsers). In the depicted embodiment, application 114 is a set of one or more programs designed to facilitate in group communications, collaborative problem solving, and coordination activities. In the depicted embodiment, application 114 may reside on client computing device 110. In another embodiment, application 114 may reside on server computer 120 or on another device (not shown) connected over network 102.

Server computer 120 can be a standalone computing device, a management server, a web server, a mobile computing device, or any other electronic device or computing system capable of receiving, sending, and processing data. In other embodiments, server computer 120 can represent a server computing system utilizing multiple computers as a server system, such as in a cloud computing environment. In another embodiment, server computer 120 can be a laptop computer, a tablet computer, a netbook computer, a personal computer (PC), a desktop computer, a personal digital assistant (PDA), a smart phone, or any programmable electronic device capable of communicating with client computing device 110 and other computing devices (not shown) within computational environment 100 via network 102. In another embodiment, server computer 120 represents a computing system utilizing clustered computers and components (e.g., database server computers, application server computers, etc.) that act as a single pool of seamless resources when accessed within computational environment 100. In the depicted embodiment, server computer 120 includes database 122 and program 150. In other embodiments, server computer 120 may contain other applications, databases, programs, etc. which have not been depicted in computational environment 100. Server computer 120 may include internal and external hardware components, as depicted and described in further detail with respect to FIG. 4.

Database 122 is a repository for data used by program 150. In the depicted embodiment, database 122 resides on server computer 120. In another embodiment, database 122 may reside on client computing device 110 or elsewhere within computational environment 100 provided program 150 has access to database 122. A database is an organized collection of data. Database 122 can be implemented with any type of storage device capable of storing data and configuration files that can be accessed and utilized by program 150, such as a database server, a hard disk drive, or a flash memory. In an embodiment, database 122 stores data used by program 150, such as historical communications, historical problems, associated solution sets, and historical author-topic-solution mappings. In the depicted embodiment, database 122 contains linguistic corpus 124 and solution efficacy model 126.

Linguistic corpus 124 is a repository for a plurality of text-based corpora (i.e., natural language representation of auditory speech, text sequences, computer encoded sequences, etc.). In an embodiment, linguistic corpus 124 contains one or more historical communications, statements, discussions, comments, utterances with one or more authors, individuals, and/or groups. In an embodiment, said historical communications are categorized, organized, and/or structured in relation to the specific author, individual or group. In another embodiment, said historical communications are structured in relation to an identified topic, problem set (e.g., may contain links or references to other related or relevant problems), and/or solution set (e.g., may contain links or references to other related or relevant solutions). In various embodiment, the information contained in linguistic corpus 124 is temporally structured. For example, said information may be constrained or limited with regards to a time period (e.g., discussion in the last month).

In an embodiment, linguistic corpus 124 contains raw, unprocessed communications. In another embodiment, linguistic corpus 124 may include a series of vectors corresponding to a plurality of determined features including, but not limited to, author, group, topic, identified problem, associated solution, related problem/solution sets, technological field (e.g., computer science, mechanical, biology, chemistry, etc.), programmatic conventions (e.g., programming language, programming language category (e.g., strong type, object oriented, procedural, etc.), and temporal events (e.g., subsets constrained by pre-determined intervals (e.g., all communications related to a specific problem/solution made in the last year), software lifecycles (e.g., sunsetting of software, new development, etc.), etc.). In various embodiments, linguistic corpus 124 includes collections of problem/solution pairs. Each pair includes a problem sequence and a corresponding solution sequence. A problem/solution sequence each may be a textual sequence, in a natural language or a computer-generated representation. In various embodiments, a problem/solution set contains or references associated problem/solution communications, discussions, comments, and/or statements either in a structured or unstructured form. In another embodiment, solution information may include the time needed to incorporate and implement a solution. This embodiment may be utilized to determine whether a user, group, or project has sufficient time and resources to implement the solution. In another embodiment, a solution is converted into a label and attached to one or more associated problems. In yet another embodiment, a pre-determined, historical, and/or generated solution efficacy rating is attached as a feature, label, or as an expected output to one or more problem sets. In an embodiment, linguistic corpus 124 may be represented as a graph database, where communications, discourse, and/or discussions are stored in relation to the authors or topics forming sequences of similar topic/communication/author combinations.

Solution efficacy model 126, hereinafter SEM 126, contains one or more models, containers, documents, subdocuments, matrices, vectors, and associated data, modeling one or more feature sets such as results from linguistic analysis, topic characterization/representations, and intra-arrival time of post frequency. In an embodiment, SEM 126 contains one or more generative (e.g., latent Dirichlet allocation (LDA), etc.) or discriminative (e.g., support vector machine (SVM), etc.) statistical models utilized to categorize one or more communications. For example, SEM 126 may train and utilize one or more generative statistical models to calculate the conditional probability of an observable X, given a target y, symbolically, $P(X|Y=y)$ and SEM 126 may train and utilize one or more discriminative models to calculate the conditional probability of the target Y, given an observation x, symbolically, $P(Y|X=x)$.

Program 150 utilizes one or more models contained in SEM 126 to identify and/or match one or more topics (e.g., categories, targeted solutions, etc.) of a problem set (e.g., messages or discussions contained in an application (e.g., chat, specialized channel, etc.)) with a proposed solution based on historical solutions and associated discussions and data. In another embodiment, SEM 126 generates one or more probabilities (e.g., probability distribution) signifying the likelihood that a given solution contains the same or substantially similar topic or field as a problem set. In an additional embodiment, SEM 126 utilizes the analysis described above, in conjunction with user feedback, continuous integration, unit testing, and/or probabilistic modeling to generate the level of effectiveness (e.g., efficacy rating) of proposed solution.

SEM 126 assesses a proposed solution by considering different features, available as structured or unstructured data, and applying relative numerical weights. Program 150 feeds a vectorized, encoded, or computer represented training set of feature data to SEM 126. In various embodiments, the data (problem) is labeled with an associated solution enabling SEM 126 to "learn" what features are correlated to a specific solution, topic, author, prior to use. In various embodiments, the labelled data includes metadata (e.g., targeted programming languages, similar programming languages, environment (e.g., platform, version, device specific variables, etc.), hardware/system specifications (e.g., memory amount/type, central processing unit (CPU) specifications, etc.), etc.) in addition to the problem and an associated solution. The training set includes examples of a plurality of features, such as tokenized problem/solution segments, associated conservations, comments, statements, discussions, variables, objects, data structures, etc. SEM 126 "learns" from the training set of data to distinguish between probable and improbable (e.g., applied against a predetermined efficacy threshold) solutions when applied to one or more specific problems. Once trained, SEM 126 can generate one or more probabilities and/or solution efficacy ratings based on the data aggregated and fed by program 150.

In an embodiment, SEM 126 utilizes deep learning techniques to pair problems to relevant solutions. In various embodiments, SEM 126 utilizes transferrable neural network algorithms and models (e.g., long short-term memory (LSTM), deep stacking network (DSN), deep belief network (DBN), convolutional neural networks (CNN), compound hierarchical deep models, etc.) that can be trained with supervised and/or unsupervised methods. In various embodiments, SEM 126 is a simple neural network. In a further embodiment, SEM 126 is a single layer feed neural network containing an affine transformation followed by element-wise nonlinearity, $y=f(Wx+b)$, where f is an element-wise non-linearity, such as sigmoid or hyperbolic tangent, and b is a bias vector. Said simple neural network can be extended with multiple hidden layers, where each layer transforms the output of the previous hidden layer to generate output for the next layer, a multi-layered perceptron (MLP). In the depicted embodiment, SEM 126 utilizes a recurrent neural network (RNN). In this embodiment, RNN processes sequential data $(x_1, x_2 \ldots, x_t)$ to calculate subsequent hidden states while the parameters of the model remain the same. The RNN can be "unfolded", taking the previous hidden state and input at that time step to generate the input for the next series of time steps, allowing information to flow through the network, so that the last cell includes information derived from all the previous cells. In an embodiment, SEM 126 utilizes gated recurrent units (GRU). GRUB simplify the training process while reducing the amount of necessary computational resources. In another embodiment, SEM 126 utilizes LSTM. LSTM entails a more robust process, requiring more computational resources but LSTM is more effective when training from large datasets. In various embodiments, the hidden layers of SEM 126 may be unidirectional or bidirectional. The training and utilization of SEM 126 is depicted and described in further detail with respect to FIG. 2.

Program 150 is a program for determining the effectiveness of a proposed solution. In the depicted embodiment, program 150 is a standalone software program. In another embodiment, the functionality of program 150, or any combination programs thereof, may be integrated into a single software program. In some embodiments, program 150 may be located on separate computing devices (not depicted) but can still communicate over network 102. In various embodiments, client versions of program 150 resides on client computing device 110 and/or any other computing device (not depicted) within computational environment 100. Program 150 is depicted and described in further detail with respect to FIG. 2.

The present invention may contain various accessible data sources, such as database 122, that may include personal storage devices and content the user wishes not to be used, program 150 allows the user to opt in or opt out of exposing personal information. Program 150 enables the authorized and secure handling of user information, such as tracking information, as well as personal information that may have been obtained, is maintained, and/or is accessible. The user can be provided with notice of the collection of portions of the personal information and the opportunity to opt-in or opt-out of the collection process. Consent can take several forms. Opt-in consent can impose on the user to take an affirmative action before the data is collected. Alternatively, opt-out consent can impose on the user to take an affirmative action to prevent the collection of data before that data is collected.

Figure 2:
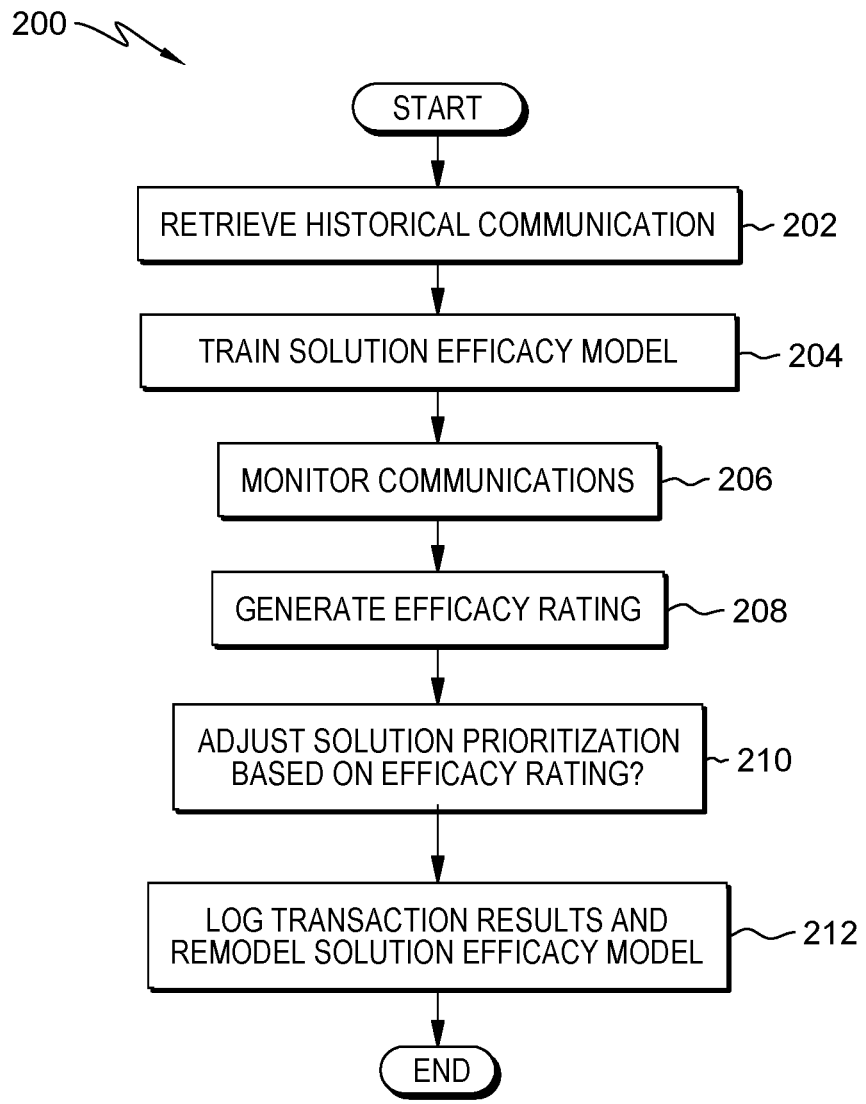
FIG. 2 is a flowchart depicting operational steps of a program, on a server computer within the computational environment of FIG. 1, for determining the effectiveness of a proposed solution, in accordance with an embodiment of the present invention.

FIG. 2 is a flowchart depicting operational steps of program 150 for determining the effectiveness of a proposed solution, in accordance with an embodiment of the present invention.

Program 150 retrieves historical communications (step 202). In an embodiment, program 150 retrieves all historical messages, conversations, discussions, utterances, and/or statements associated with a specified application (e.g., application 114), author (e.g., user), sets of authors, and/or topics. In another embodiment, program 150 can process the retrieved historical messages into multiple sets. In yet another embodiment, program 150 partitions historical conversations into discrete sets containing differently processed versions of the same discussion. In various embodiments, program 150 defines the bounds of a by utilizing predetermined response intervals. For example, if the user does not respond to a message, topic, or contribute to a discussion for more than a week, then program 150 determines that any communications sent after the time threshold is a new, distinct conversation, implying that the topic of the discussion may have shifted. In this embodiment, program 150 partitions the historical conservations into one or more sets defined by temporal constraints as described above. In various embodiments, program 150 follows hyperlinks contained in a discussion, and processes solution related text contained therein. For example, a user suggests that an appropriate solution to a specific issue is within a forum post. If said user links or transmits said link, program 150 scrapes the link and extracts the information contained within.

Program 150 utilizes natural language processing (NLP) techniques such as corpus linguistic analysis techniques (e.g., syntactic analysis, etc.) to identify parts of speech and syntactic relations between various portions of a discussion (e.g., partitioned sets, vectorized sets, etc.). Program utilizes corpus linguistic analysis techniques, such as part-of-speech tagging, statistical evaluations, optimization of rule-bases, and knowledge discovery methods, to parse, identify, and evaluate portions of a document. In an embodiment, program 150 utilizes part-of-speech tagging to identify the particular part of speech of one or more words in a discussion based on its relationship with adjacent and related words. For example, program 150 utilizes the aforementioned techniques to identity the nouns, adjectives, adverbs, and verbs in the example sentence: "Henry, I believe this link will solve your issue". In this example, program 150 identifies "Henry", "link", and "issue" as nouns, "solve" and "believe" as verbs. In another embodiment, program 150 utilizes term frequency-inverse document frequency (tf-idf) techniques to calculate how important a term is to the sentence, conversation, document, or historical chat corpus. In another embodiment, program 150 utilizes tf-idf to calculate a series of numerical weights for the words extracted from historical conversations. In a further embodiment, program 150 utilizes said calculations to identify and weigh frequently used terms. For example, program 150 increases the weight of a word proportionally to the frequency the word appears in the conversation offset by the frequency of documents (e.g., discussions), in linguistic corpus 124, that contain the word. In an embodiment, program 150 utilizes the weights calculated from tf-idf to initialize one or more neural networks.

Program 150 may utilize one or more models, such as biterm topic modeling and LDA, to identify topics, themes, and problem sets within conversations, messages, discussions, etc. In an embodiment, program 150 utilizes biterm topic modeling to model the generation of co-occurrence patterns (e.g., biterms) in a document. Program 150 utilizes biterm topic modeling to model the word co-occurrence patterns thus enhancing the identification of topics. In various embodiments, program 150 utilizes aggregated patterns in a corpus to identify topics based on co-occurrence patterns at the document-level. In another embodiment, program 150 utilizes biterm topic modeling to calculate the probability that a series of words are representative of a specified topic. In another embodiment, program 150 may utilize latent semantic analysis to decompose a matrix of documents and terms (e.g., multiple comments, conservations, etc.) into multiple sub-matrices, such as document-topic matrices or topic-term matrices. In an embodiment, program 150 utilizes probabilistic latent semantic analysis to calculate a probabilistic model that may be utilized to generate a probabilistic document-term matrix. In various embodiment, program 150 utilizes latent Dirichlet allocation (LDA) to identify one or more topics that may be contained within a discussion. LDA allows sets of observations to be explained by unobserved groups that explain why some parts of the data are similar. For example, if observations are words collected into documents, LDA posits that each document is a mixture of a small number of topics and that each word's presence is attributable to one of the document's topics. Program 150 utilizes LDA to decompose a document (e.g., discussions, collection of comments, etc.) as a mixture of various topics. For example, an LDA model might have topics that can be classified as CAT related and DOG related. A topic has probabilities of generating various words, such as milk, meow, and kitten, which can be classified and interpreted by the viewer as "CAT related". The DOG related topic likewise has probabilities of generating each word: puppy, bark, and bone might have high probability. Words without special relevance, such as "the", will have an even probability between classes or, dependent on a similarity threshold, be considered a novel topic. In an embodiment, topics are identified on the basis of automatic detection of the likelihood of term co-occurrence. A lexical term may occur in several topics with a different probability, however, with a different typical set of neighboring words in each topic.

Program 150 can process each discussion set based on one or more feature sets. For example, if the feature set is based on system environmental parameters (e.g., platform, versions, device specific variables, etc.), then program 150 transforms each word into a corresponding stem/root equivalent, eliminating redundant punctuation, participles, grammatical tenses, etc. In yet another embodiment, program 150 non-deterministically divides the processed sets into training sets and into test sets. In a further embodiment, program 150 attaches the corresponding intended recipient to each message/conversation as a label Program 150 vectorizes the partitioned problem/solution sets, along with associated message/conversation information. In an embodiment, program 150 utilizes one-hot encoding techniques to vectorize categorical or string-based feature sets. For example, when vectorizing feature sets of individual words, program 150 creates a one-hot vector comprising a 1×N matrix, where N symbolizes the number of distinguishable words. In another embodiment, program 150 utilizes one-of-c coding to recode categorical data into a vectorized form. For example, when vectorizing an example categorical (e.g., problems, topics, etc.) feature set consisting of [memory, optimization, debugging], program 150 encodes the corresponding feature set into [[1,0,0], [0,1,0], [0,0,1]]. In another embodiment, program 150 utilizes featuring scaling techniques (e.g., rescaling, mean normalization, etc.) to vectorize and normalize numerical feature sets. In various, program 150 utilizes 1da2vec (e.g., word embedding) to convert the aforementioned LDA and biterm topic results, documents, and matrices into vectorized representations.

Program 150 trains a solution efficacy model (step 204). Program 150 can train the one or more models contained in SEM 126 by feeding the processed vectors into SEM 126. In an embodiment, program 150 initializes SEM 126 with randomly generated weights. In an alternative embodiment, program 150 initializes SEM 126 with weights calculated from the analysis described above (e.g., tf-idf, etc.). In yet another embodiment, program 150 performs supervised training with the labeled vectorized data, as described in step 204. For example, program 150 feeds problem/solution pairs into SEM 126, allowing program 150 to make inferences between the problem data and the solution data (i.e., label). In this embodiment, program 150 utilizes processed training sets to perform supervised training of SEM 126. In an embodiment, program 150 trains SEM 126 with a plurality of feature vectors originating from message information extracted from related topic conservations or author specific discussion located in linguistic corpus 124. In an embodiment, program 150 retrieves all historical messages/conversations/discussions related to a specific topic, environment, application, recipient, group, author, and/or user. In another embodiment, program 150 retrieves a subset of all historical messages, conversations, and discussions between a members of a channel, group, and/or chat application.

In various embodiments, supervised training determines the difference between a prediction and a target (i.e., the error), and back-propagates the difference through the layers such that SEM 126 "learns." In an embodiment, program 150 utilizes stochastic gradient algorithms to implement backpropagation. Said algorithm may utilize the following function as the loss function, $-\log p_\theta(x^*_{t+1}|x_1, x_2, \ldots, x_t)$, where $x^*_{t+1}$ the true symbol observed in the training data at the corresponding time step and where $\theta$ denotes the parameters of the model. Program 150 may adjust the learning rate in order to adjust cross-entropy cost, allowing program 150 to increase or decrease the adaptability of related cells and layers. In an embodiment, program 150 determines whether a sufficient precision is obtained by utilizing test sets. By determining the precision, program 150 minimizes the likelihood of false positives. If the calculated precision is insufficient, then program 150 continues with supervised training of SEM 126. If the calculated precision is sufficient, then program 150 ends the training process.

Program 150 monitors real-time communications (step 206). In an embodiment, program 150 prevents transmission of messages until an efficacy rating is generated. In various embodiments, program 150 replaces and/or substitutes a graphical transmission icon within a user interface (e.g., user interface 112). For example, chat applications (e.g., application 114) have graphical icons that when activated transmit a typed message. In this example, program 150 replaces one or more icons, with the respective triggers, to intercept and retain the message before transmission. In yet another embodiment, program 150 may analyze outbound traffic of client computing device 110 to detect the transmission of a message. In this embodiment, program 150 may retain the message until the message (e.g., solution) is analyzed and approved by the user. In yet another embodiment, program 150 detects a message by detecting the user entering words in an application (e.g., application 114). In a further embodiment, program 150 may trigger analysis in response to every word or sentence the user inputs. In an alternative embodiment, program 150 may trigger message analysis after the user stops or ceases inputting or typing text/characters or manipulating user interface 112 for a specified duration. For example, the user begins to input a message and after 5 seconds of non-input, program 150 determines the message is ready to be transmitted and thus analyzes the message.

Program 150 generates an efficacy rating (step 208). Responsive to program 150 monitoring and processing communications (e.g., proposed solutions) within one or more chat applications, program 150 extracts, analyzes, and decomposes the information contained in said communications, as discussed in step 202. In an embodiment, program 150 utilizes any combination of biterm topic modeling, LDA, and trained cognitive models (e.g., RNN) to identify topics, themes, and relevant problem/solution sets within conversations, messages, discussions, as detailed in step 202, in one or more chat applications or environments. In an embodiment, program 150 processes, vectorizes, and feeds the monitored communications into the aforementioned models within SEM 126. In this embodiment, SEM 126 outputs one or more sets of probabilities denoting the likelihood that the topic of the monitored communication is contained within one or more historical topics. In another embodiment, program 150 utilizes the output generated from SEM 126 to generate a topic similarity score representing the degree of similarity between the topic of the monitored communications with historical topics identified from historical discussions contained with linguistic corpus 124. In this embodiment, program 150 utilizes one or more probabilities generated from one or more models, such as the results of the biterm modeling, and the LDA results. In a further embodiment, program 150 weights each of the aforementioned results in proportion to the degree of topic confidence associated with each model.

In various embodiments, program 150 utilizes a predefined topic threshold. In this embodiment, if program 150 determines that an output (e.g., probability, etc.) is less than the topic threshold, then program 150 associates the monitored discussion or message as a new topic (e.g., topic not defined or encountered in linguistic corpus 124). In yet another embodiment, the efficacy rating is an aggregation of the described scores and ratings with distinct weights for any combination of variables, features, components, etc. In an embodiment, utilizing the output of SEM 126, program 150 determines whether the probability associated with the proposed solution is sufficient for an identified problem set. Program 150 processes the weights and probabilities which SEM 126 calculates and assigns to the various components of the discussion (e.g., message, comment, etc.) to determine the likelihood of an effective solution. The likelihood or probability is represented as a numerical percentage.

Program 150 may utilize continuous integration to build, test, and incorporate one or more proposed solutions into a specified problem set. In an embodiment, program 150 utilizes continuous integration and associated source-code repositories to alter existing code bases utilizing one or more proposed solutions. Responsive to program 150 implementing one or more proposed solutions, program 150 runs one or more associated unit tests in order to test the effectiveness of a proposed solution on an existing code base and/or problem set. Dependent on the results of the unit tests, program 150 may adjust one or more solution efficacy ratings associated with the proposed solutions. For example, if the unit testing demonstrates that a proposed solution passes 45% of the available tests, then program 150 may decrease the solution efficacy rating associated with said solution. In another embodiment, program 150 tests every proposed solution regardless of efficacy rating. In an alternative embodiment, program 150 only utilizes continuous integration if the generated solution efficacy rating is above a predefined threshold. In an example scenario, a group of developers are troubleshooting a buffer overflow bug and discussing potential solutions in a real-time chat application while program 150 monitors and analyzes the discussion, generating solution efficacy ratings for each proposed solution. In this scenario, program 150 incorporates proposed fixes into a code base by removing faulty code, introducing the proposed code fix, compiling the code, and running tests on said complied code base. If the proposed fix is effective (e.g., passing all or the majority of tests), then program 150 pushes the changes to the repository and adjusts the solution efficacy score of the fix (e.g., solution).

Program 150 adjusts the prioritization of the solution based on efficacy rating (step 210). Based on a generated efficacy rating, as described in step 208, program 150 may generate, adjust, and present the prioritization of a solution and one or more associated discussions, comments, and suggestions dependent on the capabilities of the associated application. Responsive to the generated efficacy rating, program 150 generates, displays, modifies, or presents one or more identified comments distinguishably (e.g., distinctively, etc.) from previous, prior, or historical comments. In various embodiments, program 150 may generate, adjust, modify, transform, and/or present the appearance of a plurality of stylistic elements of messages, comments, and/or discussions. In an embodiment, said plurality may include; adjustments to font, font size, character style (e.g., bold, italics, font color, background color, superscript, subscript, capitalization, etc.), general transparency, relative transparency, etc. For example, program 150 applies a "bold" adjustment to a determined high efficacy comment. In another embodiment, program 150 applies an adjustment to all comments within the view of the user that do not meet or exceed a predefined efficacy threshold. For example, if program 150 determines that all but one comment meets or exceeds the efficacy threshold, then program 150 increases the transparency of the low efficacy comments, placing the high efficacy comment in a position of prominence compared to the low efficacy comments (e.g., solutions). In various embodiments, program 150 may display the generated efficacy rating, as a numerical score, rating, or probability, of a comment. In this embodiment, program 150 displays the rating in proximity to the corresponding comment. In another embodiment, program 150 replaces the comment with the associated efficacy rating. In a further embodiment, program 150 replaces the comment with the rating as a link (e.g., hyperlink, etc.) to the original, replaced comment. In an embodiment, program 150 retrieves, queries, prompts, or determines user preferences or settings detailing user preferred prioritization adjustments such as level of transparency, text color preferences, comment replacement procedures, and including additional information such as associated efficacy ratings and related comments.

In various embodiments, program 150 lowlights low efficacy communications. In this embodiment, lowlighting includes a plurality of methods and adjustments designed to decrease the level of focus and attentiveness of a user to a specific discussion, message, and/or solution. In an example situation where program 150 assigns a solution a low efficacy score to a solution, determining that the given solution would not adequately remediate a given problem, program 150 decreases the font size of the message in proportion with the associated efficacy score. In an embodiment, if the efficacy rating does not meet or exceed a predetermined efficacy rating, e.g., detailing a lower boundary, then program 150 may delete, remove, hide, or otherwise obscure said solution and/or the messages discussing said solution. In an embodiment, where program 150 has multiple probable solutions (e.g., solutions that have efficacy scores that meet or exceed a threshold), program 150 ranks the solutions based on associated generated efficacy ratings. For example, as program 150 displays the ranked list of probable solutions, program 150 may decrease the font size of displayed solutions as the efficacy rating of said solutions decreases. In this embodiment, program 150 may display all probable solutions, allowing the user to select a solution, rank one or more solutions, and/or provide feedback to the solutions. In various embodiments, if program 150 determines that a solution is wholly effective for a problem set, then program 150 may accept the solution, integrate the solution into one or more existing code-bases, notify one or more users regarding the accepted solution, and deprioritize any historical or subsequent solution related to the specified problem.

Program 150 logs relevant communications and remodels the solution efficacy model (step 212). In one embodiment, program 150 logs relevant conservations, comments, discussions, and associated data into linguistic corpus 124. In another embodiment, program 150 may receive user feedback through a graphical user interface (e.g., user interface 112) on client computing device 110. For example, after program 150 analyzes a discussion and an associated solution, the user can provide feedback for the discussion and the rated solution on the graphical user interface (e.g., user interface 112) of client computing device 110. In an embodiment, feedback may include a simple positive or negative response. In another embodiment, feedback may include a user confirmation of the prioritized or deprioritized solution. For example, if program 150 incorrectly deprioritized a valid solution, the user can provide negative feedback and correctly prioritize the solution and related communications. In an embodiment, program 150 feeds the user feedback and the corrected solution into SEM 126, allowing program 150 to adjust the model accordingly. In another embodiment, program 150 may use one or more techniques of NLP to log whether the response of the user is positive or negative. Program 150 logs relevant conservations, comments, discussions, and associated data into linguistic corpus 124 and retrains SEM 126 utilizing the adjusted corpus and associated training and testing sets.

Figure 3:
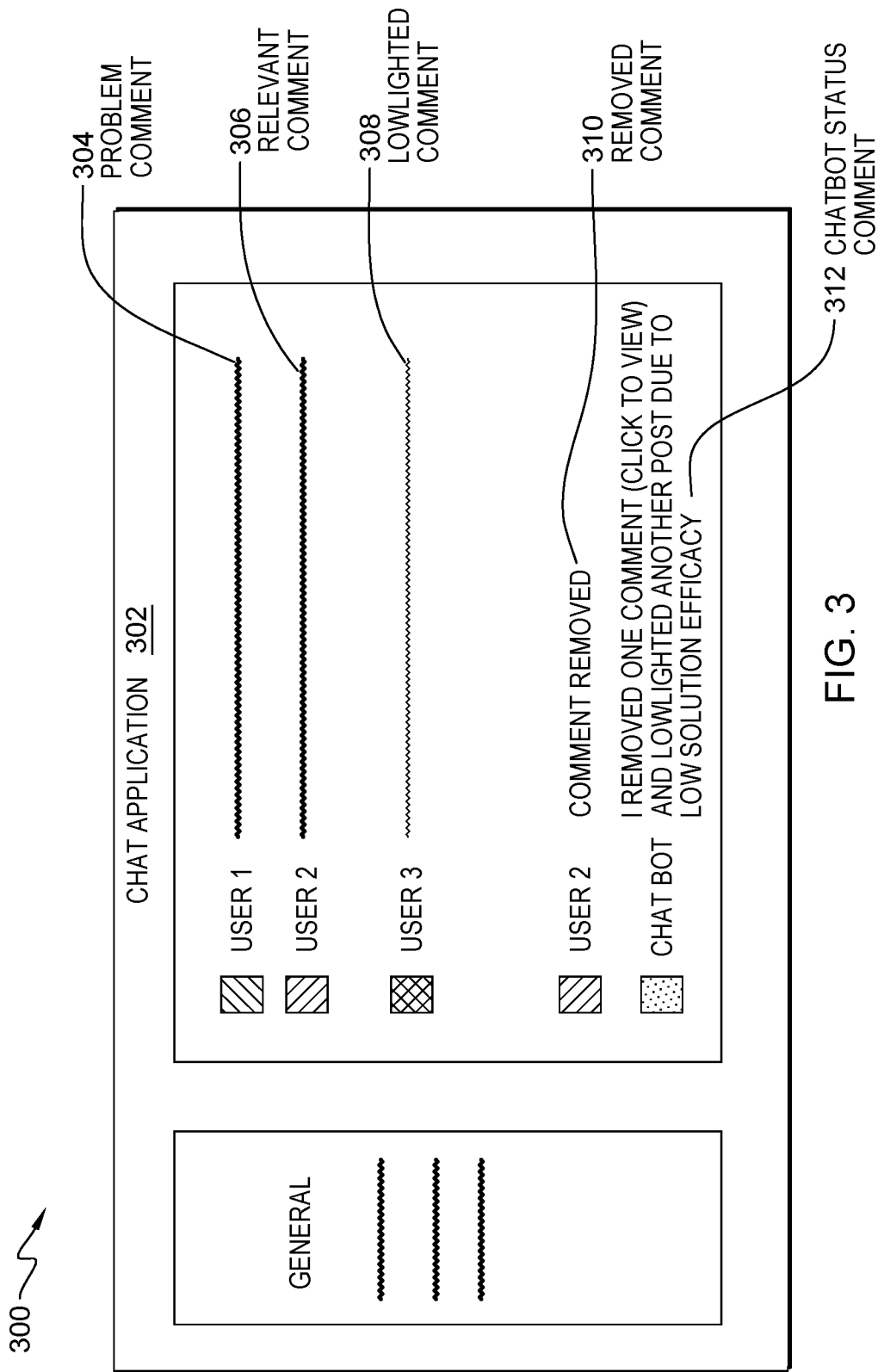
FIG. 3 depicts example 300, which is an example discussion of a problem-solving session between a plurality of employees, in accordance with an embodiment of the present invention.

FIG. 3 depicts example 300, which is an example discussion of a problem-solving session between a plurality of users. Example 300 includes chat application 302, a real-time communication application, problem comment 304, a comment introducing a problem or issue for discussion, relevant comment 306, a comment containing a proposed solution determined to be slightly relevant, lowlight comment 308, a comment containing a proposed solution determined to be potentially irrelevant, removed comment 310, a comment containing a proposed solution determined to be irrelevant, and chatbot status comment 312, a comment detailing the actions the chatbot took in relation to generated efficacy ratings.

In a detailed example of flowchart 200, user 1, user 2, and user 3 are software developers and frequently utilize a real-time communication application (e.g., chat application 302) to discuss issues and problems associated with software releases. Program 150 utilizes historical communications contained within the real-time communication application to construct a solution efficacy model specific to the topics and discussions contained with the real-time communication application or within a specific channel or sub-group. Program 150 continuously monitors the real-time communication application for new communications regarding issues or problems. User 1 transmits a comment (e.g., problem comment 304) regarding a new stack overflow problem in a submodule. Program 150 detects the new comment and determines the comment as a novel issue, identifying related topics and associated solutions. User 2 and user 3, each reply with suggested solutions to the transmitted problem. Program 150 detects each reply, extracts information, and feeds said information into the solution efficacy model. Program 150 utilizes the solution efficacy model to generate efficacy ratings (e.g., scores, gradients, etc.) to adjust the prioritization of one or more aspects of the comment in the chat application. Program 150 determines that the reply (e.g., relevant comment 306) from user 2 is relevant and does not adjust the appearance of said comment. Program 150 determines that the reply (e.g., lowlighted comment 308) from user 3 is slightly irrelevant, thus lowlighting the comment. User 2 posts another solution (e.g., removed comment 310), in which program 150 determines to be greatly off topic and program 150 removes the post from the chat application. Responsive to adjusting one or more comments, program 150 transmits a comment or notification (e.g., chatbot status comment 312) regarding lowlighting a comment (e.g., lowlighted comment 308) and removing a comment (e.g., removed comment 310) while inserting a hyper-link to the original "pre-removed" comment.

Figure 4:
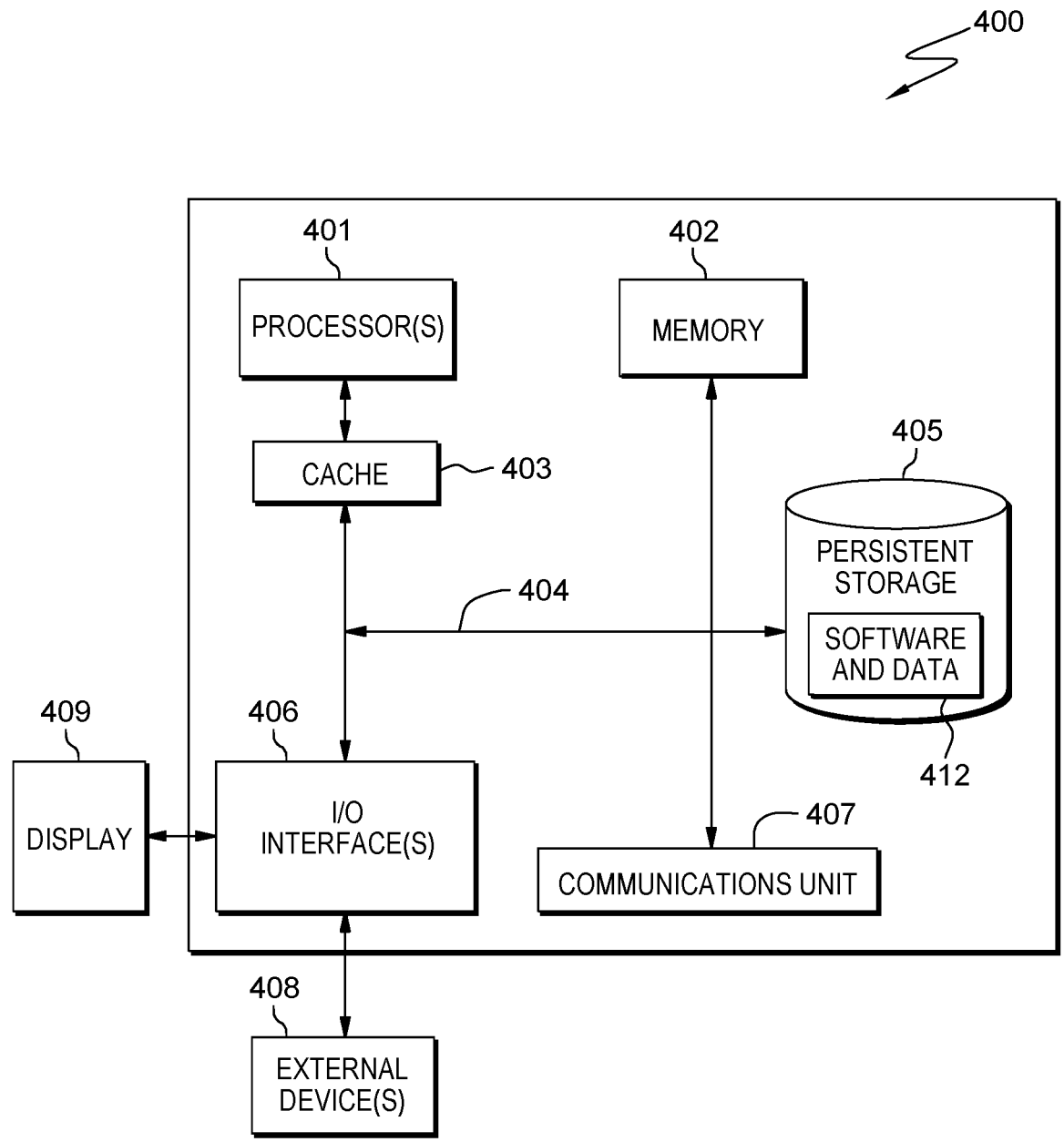
FIG. 4 is a block diagram of components of the server computer executing the program, in accordance with an embodiment of the present invention.

FIG. 4 depicts a block diagram of components of client computing device 110 and server computer 120 in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made.

Server computer 120 includes communications fabric 404, which provides communications between cache 403, memory 402, persistent storage 405, communications unit 407, and input/output (I/O) interface(s) 406. Communications fabric 404 can be implemented with any architecture designed for passing data and/or control information between processors (such as microprocessors, communications, and network processors, etc.), system memory, peripheral devices, and any other hardware components within a system. For example, communications fabric 404 can be implemented with one or more buses or a crossbar switch.

Memory 402 and persistent storage 405 are computer readable storage media. In this embodiment, memory 402 includes random access memory (RAM). In general, memory 402 can include any suitable volatile or non-volatile computer readable storage media. Cache 403 is a fast memory that enhances the performance of computer processor(s) 401 by holding recently accessed data, and data near accessed data, from memory 402.

Program 150 may be stored in persistent storage 405 and in memory 402 for execution by one or more of the respective computer processor(s) 401 via cache 403. In an embodiment, persistent storage 405 includes a magnetic hard disk drive. Alternatively, or in addition to a magnetic hard disk drive, persistent storage 405 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 405 may also be removable. For example, a removable hard drive may be used for persistent storage 405. Other examples include optical and magnetic disks, thumb drives, and smart cards that are inserted into a drive for transfer onto another computer readable storage medium that is also part of persistent storage 405. Software and data 412 can be stored in persistent storage 405 for access and/or execution by one or more of the respective processors 401 via cache 403.

Communications unit 407, in these examples, provides for communications with other data processing systems or devices. In these examples, communications unit 407 includes one or more network interface cards. Communications unit 407 may provide communications through the use of either or both physical and wireless communications links. Program 150 may be downloaded to persistent storage 405 through communications unit 407.

I/O interface(s) 406 allows for input and output of data with other devices that may be connected to client computing device 110. For example, I/O interface(s) 406 may provide a connection to external device(s) 408, such as a keyboard, a keypad, a touch screen, and/or some other suitable input device. External devices 408 can also include portable computer readable storage media such as, for example, thumb drives, portable optical or magnetic disks, and memory cards. Software and data used to practice embodiments of the present invention, e.g., program 150, can be stored on such portable computer readable storage media and can be loaded onto persistent storage 405 via I/O interface(s) 406. I/O interface(s) 406 also connect to a display 409.

Display 409 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, conventional procedural programming languages, such as the "C" programming language or similar programming languages, and quantum programming languages such as the "Q" programming language, Q#, quantum computation language (QCL) or similar programming languages, low-level programming languages, such as the assembly language or similar programming languages. The computer readable program instructions may execute entirely on the user's computer, partly on the user's computer, as a standalone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:
1. A computer-implemented method comprising:
   monitoring, by one or more computer processors, real-time communications;

responsive to a detected message transmission, identifying, by one or more computer processors, one or more topics associated with a detected message;

feeding, by one or more computer processors, the identified one or more topics and the detected message into a solution efficacy model;

generating, by one or more computer processors, based on one or more calculations by the solution efficacy model, an efficacy rating indicating a likelihood of an effective solution associated with the identified one or more topics;

continuously integrating, by one or more computer processors, the effective solution into a codebase associated with the detected message;

responsive to the integrated codebase, running, by one or more computer processors, one or more unit tests to test effectiveness of the integrated codebase;

responsive to one or more unit test results, adjusting, by one or more computer processors, the generated efficacy rating based on the one or more unit test results;

responsive to passing all unit tests, pushing, by one or more computer processors, the integrated codebase to a repository;

responsive to the adjusted efficacy rating failing to exceed the threshold, lowlighting, by one or more computer processors, the detected message, wherein lowlighting decreases a level of focus and attentiveness of a user to the detected message;

responsive to the adjusted efficacy rating exceeding the threshold, replacing, by one or more computer processors, the detected message with the adjusted efficacy rating as a hyperlink to the replaced detected message; and responsive to an accepted effective solution, deprioritizing, by one or more computer processors, historical communications related to the one or more identified topics.

2. The method of claim 1, further comprises:

retrieving, by one or more computer processors, historical communications;

determining, by one or more computer processors, one or more topics associated with the retrieved historical communications;

determining, by one or more computer processors, one or more solutions associated with the determined topics; and training, by one or more computer processors, the solution efficacy model based, at least in part, on the determined solutions and determined topics.

3. The method of claim 2, further comprises:

feeding, by one or more computer processors, the identified one or more topics associated with the monitored real-time communications into the trained solution efficacy model; and generating, by one or more computer processors, based on one or more calculations by the trained solution efficacy model, an efficacy rating for the fed detected message.

4. The method of claim 2, wherein the one or more topics associated with historical communications are limited by a plurality of features selected from the group consisting of: identified one or more authors, related problem sets, related solutions, related programmatic conventions, and temporal events.

5. The method of claim 1, wherein the solution efficacy model is a recurrent neural network.

6. The method of claim 1, wherein the solution efficacy model is a latent Dirichlet allocation.

7. The method of claim 1, further comprises:

logging, by one or more computer processors, the detected message, associated topics, associated solutions, and generated efficacy ratings into a linguistic corpus; and retraining, by one or more computer processors, the solution efficacy model utilizing the linguistic corpus.

* * * * *